United States Patent
Ebiko et al.

(10) Patent No.: US 8,381,786 B2
(45) Date of Patent: Feb. 26, 2013

(54) PNEUMATIC TIRE

(75) Inventors: Masahiro Ebiko, Hiratsuka (JP);
Hiroshi Tokizaki, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 13/118,744

(22) Filed: May 31, 2011

(65) Prior Publication Data
US 2012/0118466 A1 May 17, 2012

(30) Foreign Application Priority Data
Nov. 17, 2010 (JP) .................................. 2010-256439

(51) Int. Cl.
*B60C 13/00* (2006.01)
*B60C 13/02* (2006.01)
(52) U.S. Cl. ........................................ 152/523; 152/524
(58) Field of Classification Search .................. None
See application file for complete search history.

(56) References Cited

U.S. PATENT DOCUMENTS

| | | | | |
|---|---|---|---|---|
| 5,267,595 | A | * | 12/1993 | Lampe ........................... 152/525 |
| 5,303,758 | A | | 4/1994 | Clementz et al. |
| 5,645,661 | A | * | 7/1997 | Clementz et al. ............. 152/523 |
| 2004/0003881 | A1 | | 1/2004 | Ebiko |
| 2011/0030862 | A1 | | 2/2011 | Hayashi et al. |

FOREIGN PATENT DOCUMENTS

| | | | |
|---|---|---|---|
| EP | 2 022 615 A1 | | 2/2009 |
| JP | 3-028492 B2 | | 2/1991 |
| JP | 04-238703 A | | 8/1992 |
| JP | 06-080003 A | | 3/1994 |
| JP | 8-282215 | * | 10/1996 |
| JP | 2000-016030 A | | 1/2000 |
| JP | 3028492 B2 | | 2/2000 |
| JP | 2005-306258 A | | 11/2005 |
| JP | 2010-155576 | * | 7/2010 |
| JP | 2010-254088 | * | 11/2010 |
| WO | WO-2009/139182 A1 | | 11/2009 |

OTHER PUBLICATIONS

Machine translation of JP 2010-254088, 2010.*
Decision to Grant a Patent corresponding Japanese Patent Application No. 2010-256439, dated Jul. 12, 2011.
International Search Report of corresponding International Application No. PCT/JP2011/005636, dated on Dec. 22, 2011.

* cited by examiner

*Primary Examiner* — Justin Fischer
(74) *Attorney, Agent, or Firm* — Global IP Counselors, LLP

(57) ABSTRACT

A pneumatic tire has no spew or no spew trace on a sidewall surface of the pneumatic tire and reduces air resistance. The tire includes a plurality of dimple-like recesses and a plurality of linear valley portions. The dimple-like recesses are provides in a first region including a tire maximum width position of the sidewall surface of the tire. The linear valley portions which are formed by serration of the sidewall surface, extend linearly in one direction in the first region and provided around each of the recesses so as to enclose each of the recesses. When a size of an occupied area of each of the recesses on the sidewall surface is represented by an equivalent diameter of a circle, an interval distance between the linear valley portions is smaller than the equivalent diameter.

20 Claims, 17 Drawing Sheets

|  | Conventional example 1 | Conventional example 2 | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Presence or absence of recesses | Present | Present | Present | Present | Present | Present | Present | Present | Present | Present | Present | Present |
| Depth of recesses | 0.5 | 0.5 | 0.5 | 0.5 | 0.5 | 0.5 | 0.5 | 0.5 | 0.5 | 0.5 | 0.5 | 0.5 |
| Equivalent diameter (mm) | 6 | 6 | 6 | 3 | 15 | 6 | 6 | 6 | 6 | 6 | 2 | 16 |
| Area ratio (%) | 40 | 40 | 40 | 40 | 40 | 25 | 60 | 20 | 65 | 40 | 40 | 40 |
| Presence or absence of serration | Absent | Absent | Present | Present | Present | Present | Present | Present | Present | Present | Present | Present |
| Depth of valley | — | — | 0.3 | 0.3 | 0.3 | 0.3 | 0.3 | 0.3 | 0.3 | 0.3 | 0.3 | 0.3 |
| Hardness of side rubber | 60 | 60 | 60 | 60 | 60 | 60 | 60 | 60 | 60 | 60 | 60 | 60 |
| Presence or absence of spew trace | 64 spews | 0 | 0 | 0 | 0 | 0 | 0 | 0 | 0 | 64 spews | 0 | 0 |
| Fuel efficiency | 100 | 100.5 | 101 | 100.8 | 100.8 | 100.8 | 101.5 | 100.5 | 100.5 | 100.5 | 100.5 | 100.5 |
| Average ratio of non-defective | 98 | 90 | 99 | 99 | 99 | 99 | 99 | 99 | 99 | 100 | 99 | 99 |

FIG.21

PNEUMATIC TIRE

CROSS-REFERENCE TO RELATED APPLICATIONS

This application claims priority to Japanese Patent Application No. JP2010-256439, filed on Nov. 17, 2010, Japanese Design Application No. JP2010-028577, filed on Nov. 30, 2010 and Japanese Design Application No. JP2010-028580, filed on Nov. 30, 2010. The entire disclosures of Japanese Patent Application No. JP2010-256439, Japanese Design Application No. JP2010-028577 and Japanese Design Application No. JP2010-028580 are hereby incorporated herein by reference.

BACKGROUND

1. Field of the Invention

The present invention relates to a pneumatic tire, and relates particularly to a design of a sidewall surface of a pneumatic tire.

2. Background Information

In order to improve the fuel efficiency of a vehicle mounted with a pneumatic tire and enhance the maximum speed of a vehicle, the rolling resistance of the pneumatic tire is required to be reduced. In order to reduce the rolling resistance of the pneumatic tire, there have been proposed various embodiments in which the structure of the pneumatic tire, a tread pattern design, and so on are modified.

Further, in order to improve the fuel efficiency of a vehicle and enhance the maximum speed of a vehicle, there has been proposed to reduce the air resistance of a rolling pneumatic tire. The air resistance of the pneumatic tire is affected by unevenness of a tread pattern provided on a surface of a tread portion and unevenness of a mark and a pattern provided on a sidewall surface.

For example, Japanese Patent No. 3028492 describes a pneumatic tire which can reduce air resistance without losing tire performance. In the pneumatic tire, a large number of recesses or protrusions with an equivalent diameter of 3 to 15 mm are distributed on a surface of a sidewall portion all over the circumference. Specifically the recesses or protrusions are provided in a region of at least 10% of the surface area of the sidewall portion on the upper and lower portions in the radial direction around the position of a tire maximum width W.

The recesses or protrusions are intended to cause separation of an air layer on the tire surface move backward as much as possible, whereby generation of a vortex flow is suppressed. Thus, it is regarded that the air resistance in high-speed driving is reduced without losing the tire performance, and the maximum speed of a vehicle can be enhanced.

SUMMARY

However, in the above pneumatic tire, when recesses are provided on the surface of the sidewall portion, in a vulcanization process of the tire manufacturing processes, a protrusion of a tire mold for vulcanization corresponding to each of the above recesses pushes the sidewall surface of an unvulcanized tire to forcibly form a recess shape on the unvulcanized tire. Therefore, vulcanization is not appropriately performed due to occurrence of air accumulation between the sidewall surface surrounding the recesses and the tire mold for vulcanization, and an appearance failure of the sidewall surface easily occurs. Thus, a portion on the tire mold surrounding the protrusion of the tire mold is required to have a large number of air vent holes for removing air from an air accumulation space. The air vent holes can solve the air accumulation problem in the tire mold, however, partial fluidized rubber of the unvulcanized tire flows into the air vent holes after the air is vented. Consequently, a large number of whisker-like protrusions, that is, spews are generated on the sidewall surface of the pneumatic tire. The spews are protruded portions of sidewall rubber corresponding to the shape of the air vent hole.

Since the spews are not preferable for tire products, the spews may be cut in an inspection process. However, the protrusions of the spews cannot be completely removed even by the cutting, so that convex-shaped spew traces of approximately 0.5 to 1 mm remain. The spew traces are not preferable for the appearance of the pneumatic tire and may be an obstacle to reduction of the air resistance.

Thus, it is an object of the invention to provide a pneumatic tire which has no spew and spew trace on a sidewall surface of the pneumatic tire and can reduce air resistance.

Accordingly, an embodiment of the present invention provides a pneumatic tire. The pneumatic tire includes a plurality of dimple-like recesses provided in a first region including a tire maximum width position of a sidewall surface of the pneumatic tire; and a plurality of linear valley portions formed by serration of the sidewall surface, the linear valley portions extending linearly in one direction in the first region and provided around each of the recesses so as to enclose each of the recesses.

When a size of an occupied area of each of the recesses on the sidewall surface is represented by an equivalent diameter of a circle, an interval distance between the linear valley portions is preferably smaller than the equivalent diameter. The equivalent diameter is preferably 3 to 10 times the interval distance between the linear valley portions. The equivalent diameter is preferably 3 to 15 mm.

Preferably, the first region includes a second region in which the recesses are arranged in a cluster, and in the second region, an area ratio of entire area occupied by the recesses to a surface area of the second region is 25 to 60%.

The depth from the sidewall surface of each of the valley portions is preferably smaller than the depth from the sidewall surface of each of the recesses. Then, each of the recesses is preferably formed to be more depressed than a bottom surface of any of the valley portions adjacent to each of the recesses.

Hardness according to a durometer hardness test (type A) specified in JIS K6253 under temperature of 20° C. of a side rubber member used in the first region can be 56 to 65. The pneumatic tire can include a circumferential rib-like protrusion continuously extending in a tire circumferential direction and keeping contact with a side edge periphery in a tire radial direction of the first region. The protrusion can be provided with a spew point-like projection at a top portion thereof. A ridge formed between adjacent valley portions of the first region can be connected to the circumferential rib-like protrusion.

When a size of an occupied area of each of the recesses on the sidewall surface is represented by an equivalent diameter of a circle and an equivalent diameter of an outermost recess among the recesses located at an outermost position in a tire radial direction is compared with an equivalent diameter of an innermost recess among the recesses located at an innermost position in the tire radial direction, the equivalent diameter of the outermost recess is preferably larger than the equivalent diameter of the innermost recess, and the equivalent diameter preferably increases from an inside to an outside in the tire radial direction successively or in a step-by-step manner between the innermost recess and the outermost recess.

Preferably, the valley portions are terminated immediately before the valley portions are abutted against the recesses so that the valley portions do not connect to the recesses. In the first region, rows of the recesses extending in one direction are preferably provided in each certain circumferential angle in the tire circumferential direction.

The pneumatic tire can include: an undecorated region having a smooth surface without the valley portions and provided so as to be adjacent to an side edge periphery of the first region; and a mark region representing a mark including characters, symbols, or a combination of characters and symbols and provided so as to be surrounded by the undecorated region. A top portion of a ridge formed between adjacent valley portions in the first region is preferably located at a depressed position relative to the smooth surface.

In the pneumatic tire, a sidewall surface has no spew or spew trace, and the air resistance can be reduced. Even if the thickness of a sidewall rubber member of the pneumatic tire is reduced in order to reduce the rolling resistance, an appearance failure of the sidewall surface hardly occurs.

BRIEF DESCRIPTION OF THE DRAWINGS

Referring now to the attached drawings which form a part of this original disclosure:

FIG. 21 illustrates a table showing specifications and evaluation results of examples and conventional examples of a pneumatic tire.

DETAILED DESCRIPTION OF EMBODIMENTS

Figure 1:
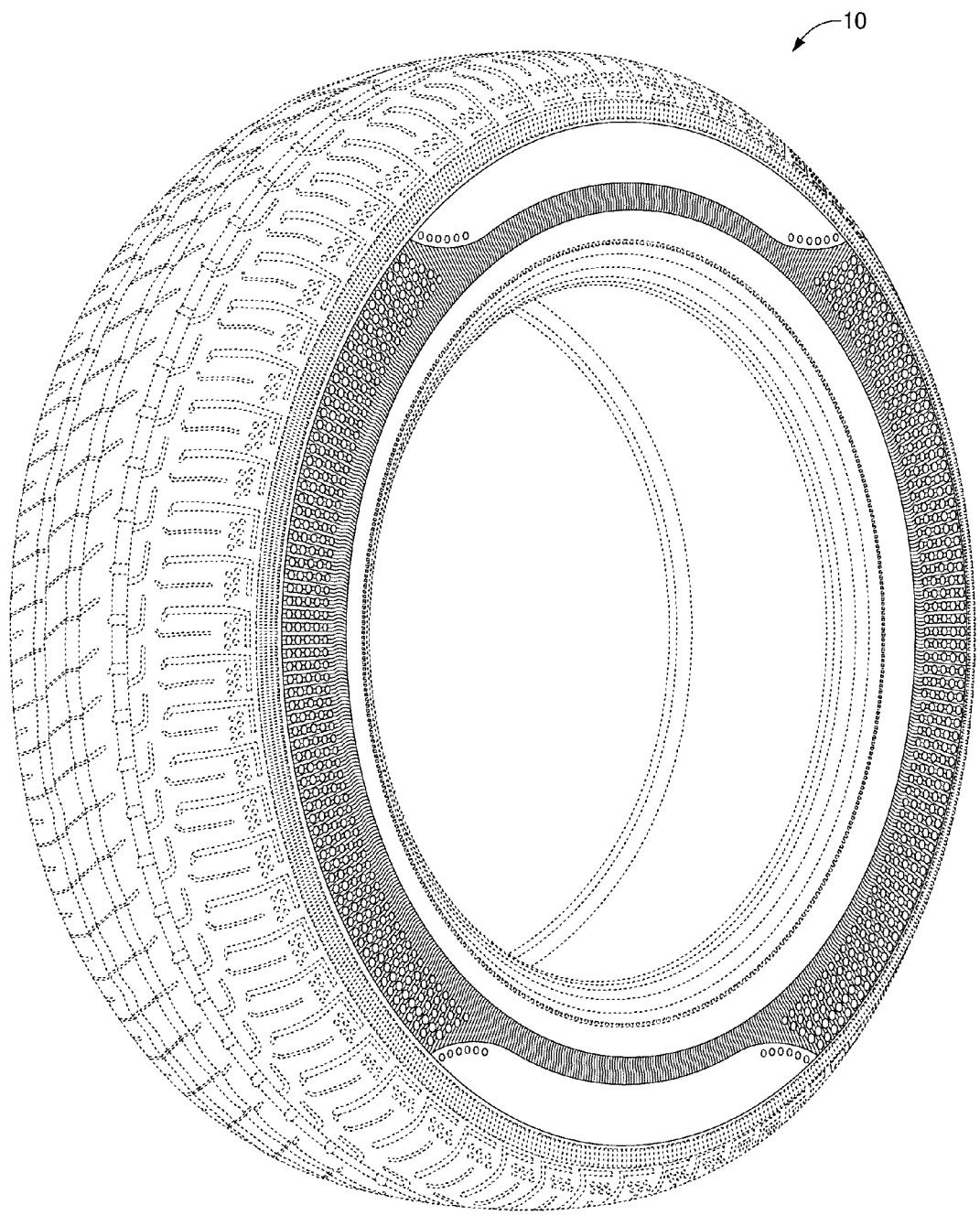
FIG. 1 is a perspective view showing an ornamental design of a pneumatic tire of a disclosed embodiment with parts of the sidewall portions, the tread portions and the bead portions being indicated by broken lines.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

FIGS. 1 to 3, 5 and 9 to 12 illustrate an ornamental design for the pneumatic tire 10 as described herein. In the case of a partial tire design of the pneumatic tire 10, the broken line illustration of the environmental structure (the remaining structure of the pneumatic tire 10) in the drawings is not part of the claimed design. However, in the case of a full tire design of the pneumatic tire 10, the broken lines can instead be depicted as solid lines to illustrate incorporation of the remaining structure as part of the ornamental design for the pneumatic tire 10.

Figure 4:
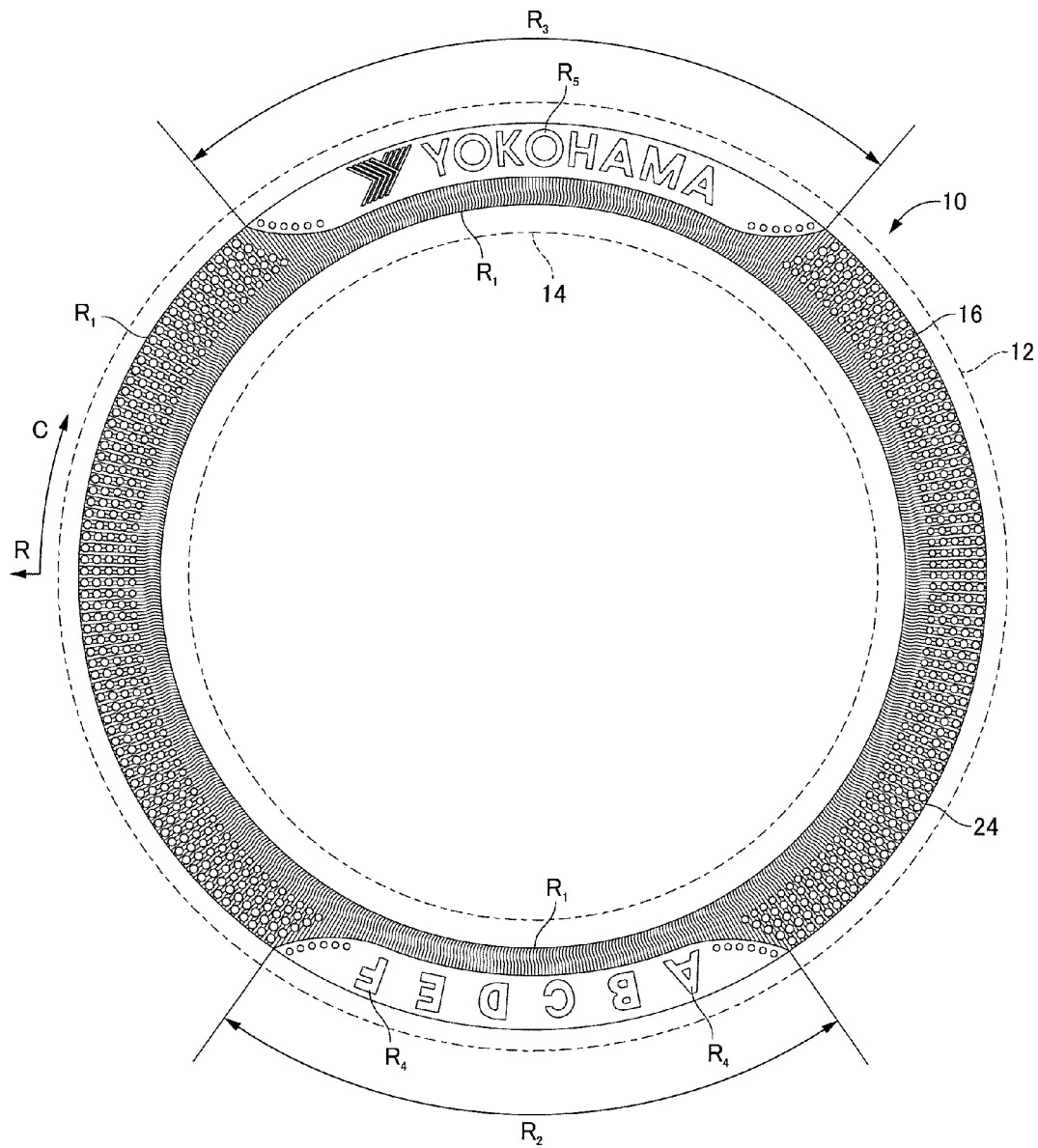
FIG. 4 is a view illustrating a surface of a sidewall portion of an illustrated embodiment that is included in the ornamental design for the pneumatic tire shown in FIG. 1.
Figure 5:
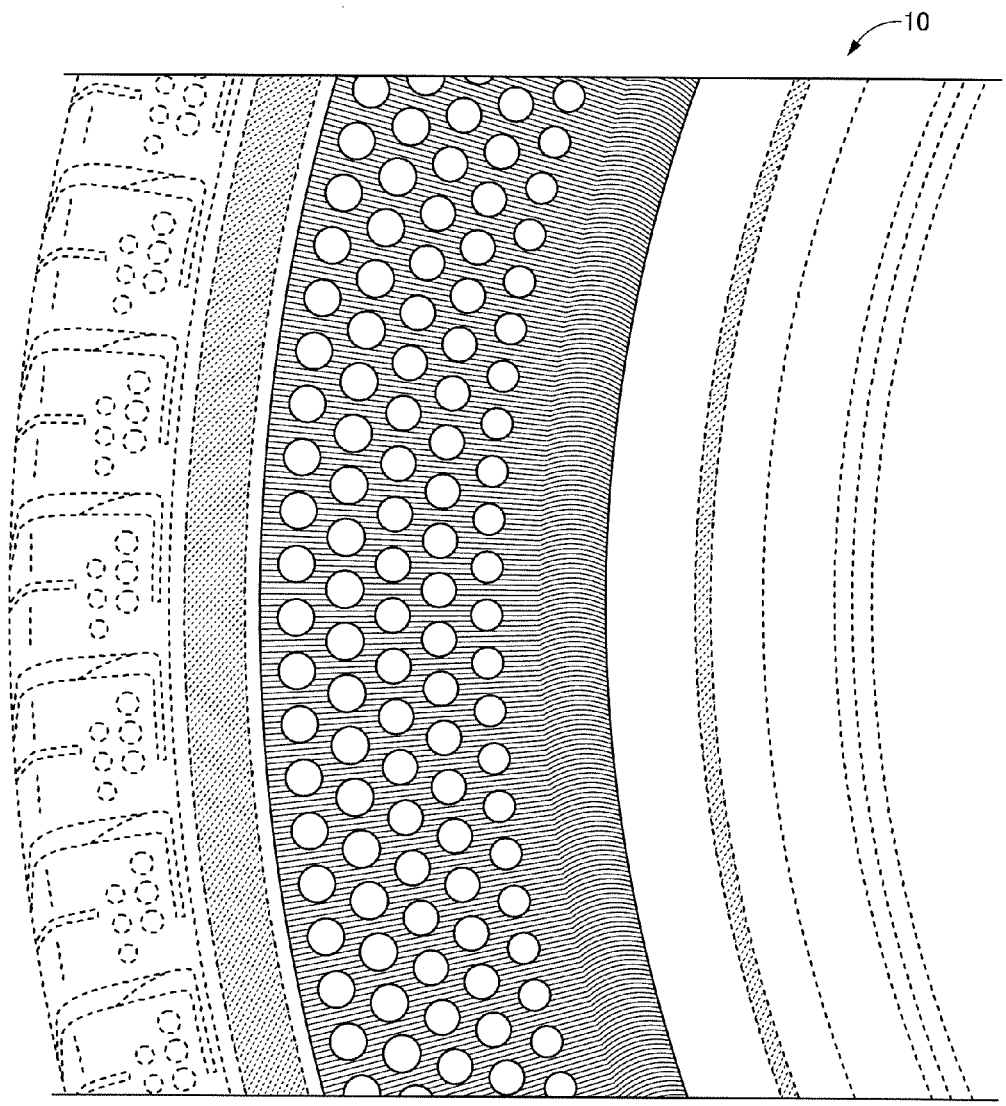
FIG. 5 is an enlarged view of a sidewall portion of the ornamental design for the pneumatic tire shown in FIG. 1 including the illustrated embodiment as shown in FIG. 4.

FIG. 4 is a view illustrating a surface of a sidewall portion of the pneumatic tire 10 of an embodiment. The sidewall portion is positioned between a tire tread portion (a portion represented by a circular arc 12 in FIG. 4) and a bead portion (a portion represented by a circular arc 14 in FIG. 4).

The pneumatic tire of this embodiment has well-known structure and shape, which is to say, the pneumatic tire principally has structural core members including a carcass, belts and bead cores (not illustrated), and rubber members including a tread rubber member, side rubber member, bead filler rubber members, and an inner liner rubber member. Thus, the description of those members will be omitted.

The pneumatic tire of the present embodiment is, for example, a passenger car tire specified in chapter A of JATMA YEAR BOOK 2009 (Japan Automobile Tyre Manufacturers Association). In addition, the pneumatic tire of the present embodiment can be applied to a tire for a small truck specified in chapter B and a tire for truck and bus specified in chapter C.

A tire circumferential direction in this specification refers to a direction in which a tread surface of the tire moves when a tire is rotating around a tire rotation axis. A tire radial direction refers to a direction extending vertically to the tire rotation axis. In FIG. 4, a C direction is indicative of the tire circumferential direction, and an R direction is indicative of the tire radial direction.

A plurality of dimple-like recesses 16 (white circles illustrated in FIG. 4) are provided in a first region $R_1$ including a tire maximum width position on a surface of the sidewall portion of the pneumatic tire 10. The tire maximum width position means a position in the tire radial direction where the tire width in a tire width direction is at the maximum. A plurality of linear valley portions 18 which extend in one direction are provided around each of the recesses 16 so as to enclose each of the recesses 16. The linear valley portions 18 are formed by serration of the sidewall surface. Between the adjacent valley portions 18, a ridge (see FIG. 7) 20 extends along the valley portions 18. By virtue of the provision of the valley portions 18, the ridge 20 is formed, and a serration pattern is formed by the valley portions 18 and the ridges 20.

Undecorated regions $R_2$ and $R_3$ having a smooth surface 22 (see FIG. 7) with no valley portions 18 are provided so as to be adjacent to a side edge periphery of the first region $R_1$. Mark regions $R_4$ and $R_5$ representing a mark including characters, symbols, or a combination of characters and symbols are provided so as to be surrounded by the undecorated regions $R_2$ and $R_3$. The mark region $R_5$ includes a mark that allows the present applicant name to be identified. The mark region $R_4$ includes a mark of the brand name "ABCDEF" of the pneumatic tire of the present embodiment.

The width of the first region $R_1$ gets smaller at the positions in the tire circumferential direction where the undecorated regions $R_2$ and $R_3$ are provided. The first region $R_1$ is provided inward in the tire radial direction, and the undecorated regions $R_2$ and $R_3$ are provided outward in the tire radial direction. The small width portions of the first region $R_1$ and the undecorated regions $R_2$ and $R_3$ are provided so as to keep contact with each other along the tire circumferential direction. There is no recess 16 in the small width portions of the first region $R_1$.

The undecorated regions $R_2$ and $R_3$ have at their edge in the tire circumferential direction a plurality of the recesses 16 provided in a row along each of the side edge peripheries of the undecorated regions $R_2$ and $R_3$. Although such a side pattern of the sidewall portion is provided on one side surface of the pneumatic tire 10, it may be provided on both side surfaces of the pneumatic tire.

Figure 6:
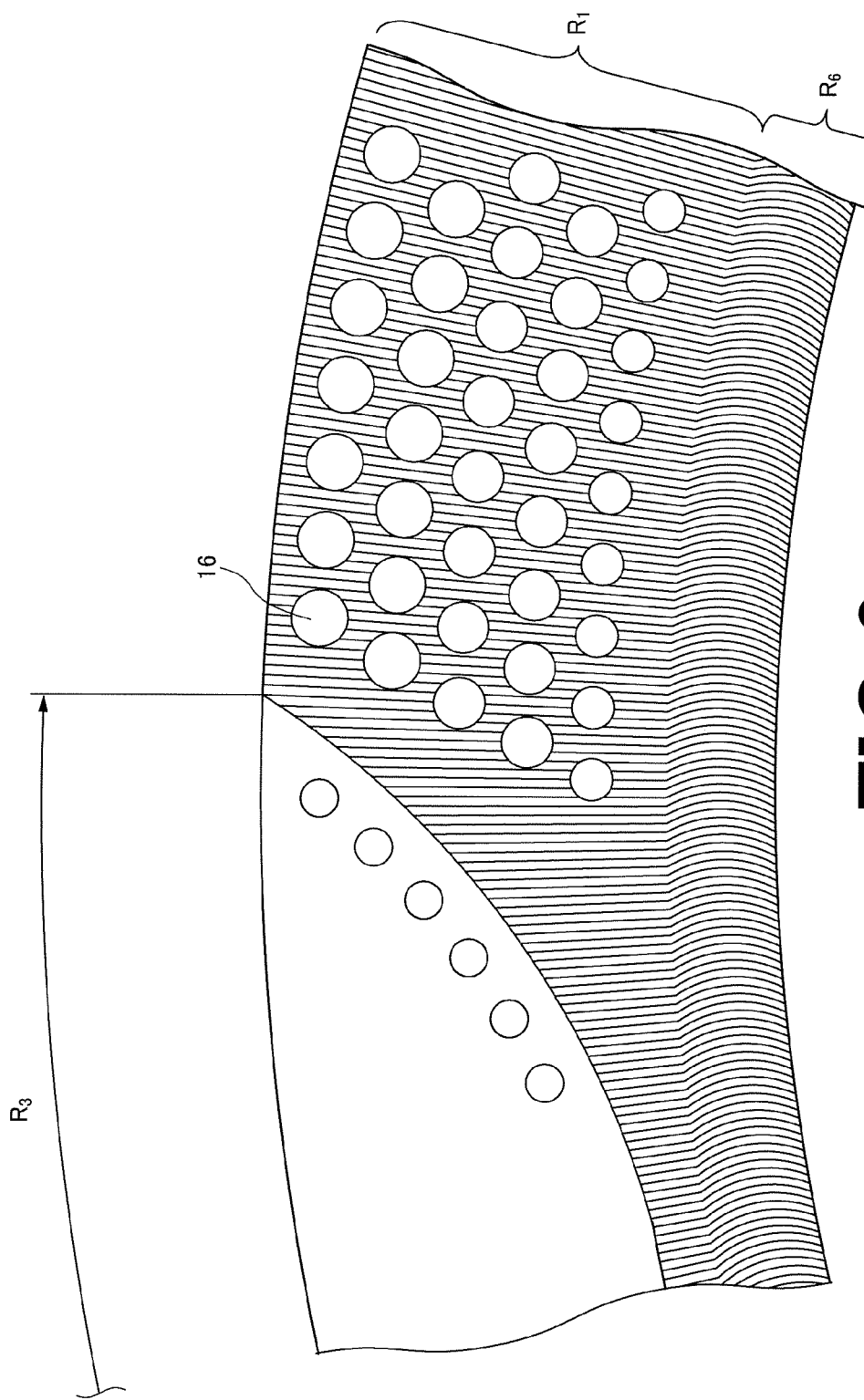
FIG. 6 is an enlarged view of a first region and a mark region of the embodiment shown in FIG. 4.

FIG. 6 is an enlarged view of the first region $R_1$ and the undecorated region $R_3$. A plurality of lines illustrated in the first region $R_1$ in FIG. 6 represent the valley portions 18 forming the serration pattern.

The valley portions 18 extend linearly in the tire radial direction in the first region $R_1$ and is curved and extend further in a region $R_6$ beyond the region $R_1$. The region $R_6$ is provided inward in the tire radial direction of the first region $R_1$.

An interval distance between the linear valley portions 18 illustrated by the straight lines in FIG. 6 is small relative to an equivalent diameter of a circle when a size of an occupied area of each of the recesses 16 on the sidewall surface is represented by the equivalent diameter of the circle. In the present embodiment, although the contour of the recess 16 is a circular shape, it is not limited to the circular shape. For example, the contour of the recess 16 may be a triangular shape, a quadrangular shape, a pentagonal shape, or a hexagonal shape. The equivalent diameter is 3 to 15 mm, for example. If the equivalent diameter is less than 3 mm, as described later, turbulence separation, due to the recesses 16, of air layer surrounding the rotating pneumatic tire hardly occurs, and the effect of reducing the air resistance is reduced, so that the fuel efficiency of a running vehicle is deteriorated. The equivalent diameter is preferably 3 to 10 mm, and more particularly 4 to 8 mm. It is preferable that the equivalent diameter is 3 to 10 times the interval distance between the adjacent valley portions 18.

The first region $R_1$ has a partial region (a second region) in which the recesses 16 are arranged at a certain interval in a cluster. It is preferable from a viewpoint of reduction of the air resistance that an area ratio of the entire area occupied by the recesses 16 to a surface area of the partial region is 25 to 60%.

Figure 7:
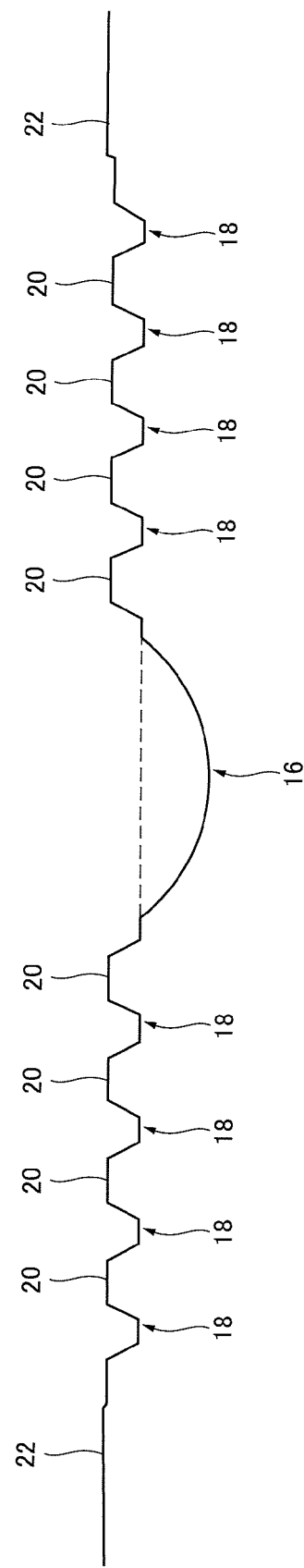
FIG. 7 is an enlarged view for explaining an arrangement of a valley portion and a recess in the embodiment shown in FIG. 4.

FIG. 7 as discussed above is an enlarged view for explaining an arrangement of the valley portion 18 and the recess 16. It is preferable that the depth from the sidewall surface of the valley portion 18 is smaller than the depth from the sidewall surface of the recess 16. The sidewall surface is the smooth surface 22 of the undecorated regions $R_2$ and $R_3$. The depth from the sidewall surface of the valley portion 18 is smaller than the depth from the sidewall surface of the recess 16, whereby the appearance failure can be effectively reduced, and, at the same time, the air resistance can also be effectively reduced. It is preferable that the depth of the valley portion 18 is smaller by 0.2 to 1.0 mm than the depth of the recess 16. When the subtraction of the depth of the valley portion 18 from the depth of the recess 16 is less than 0.2 mm, the effect of reducing the air resistance is reduced. Meanwhile, when the subtraction of the depth of the valley portion 18 from the depth of the recess 16 is more than 1.0 mm, the appearance failure easily occurs. The ridge 20 located between the adjacent valley portions 18 is depressed with reference to the smooth surface 22. Accordingly, in the sidewall surface, the ridge 20, the valley portion 18, and the recess 16 are depressed more deeply in this order with reference to the smooth surface 22. The depression means that the level of the sidewall shifts toward a tire inner surface facing a tire cavity region between the tire and a rim to which the tire is mounted.

In the present embodiment, although the recesses 16 have the same depth and also the valley portions 18 have the same depth, they may not necessarily have the same depth and their depths may be variable. As illustrated in FIG. 7, it is preferable that the recess 16 is formed so as to be more depressed than the bottom surfaces of the valley portions 18 adjacent to the recess 16. Even if rubber with a hardness (measured at a temperature of 20° C. using a durometer of type A according to a durometer hardness test specified in JIS K6253) of 56 to 65 is used for a side rubber member in the first region $R_1$, the appearance failure due to the air accumulation in the vulcanization hardly occurs.

A circumferential rib-like protrusion 24 (see FIG. 4) are continuously extends in a tire circumferential direction and keeps contact with a side edge periphery in a tire radial direction of the first region $R_1$. The circumferential rib-like protrusion 24 corresponds to a vent groove communicating the vent holes of the vulcanization tire mold. Ridges formed between adjacent valley portions 18 in the first region $R_1$ are connected to the circumferential rib-like protrusion 24. In the tire vulcanization process, when an unvulcanized tire is pressurized from the tire inner circumferential surface to be pressed against the vulcanization tire mold which encloses the unvulcanized tire, the vent groove allows air to flow in order to prevent the occurrence of the air accumulation, so that air flowing through linear recesses of the vulcanization tire mold corresponding to the ridges 20 is discharged from the vent holes. Accordingly, the circumferential rib-like protrusion 24 has at its top portion a spew point-like projection as the spew trace corresponding to the vent hole. The width of the circumferential rib-like protrusion 24 is 0.3 to 1.0 mm, for example, and the height from the sidewall surface of the circumferential rib-like projection 24 is 0.2 to 1.0 mm. The width and the height of the circumferential rib-like protrusion 24 may vary in the tire circumferential direction.

Figure 2:
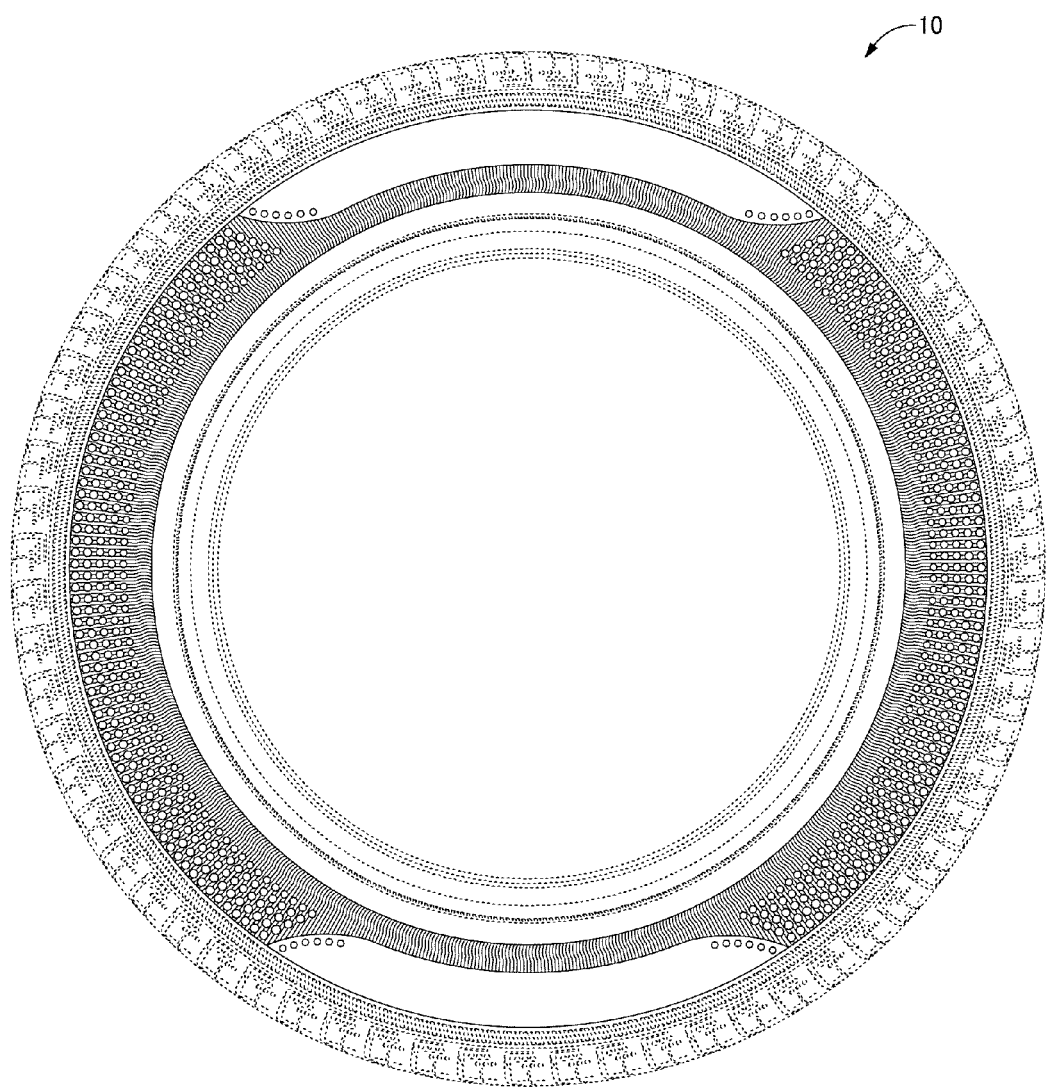
FIG. 2 is a front view of the ornamental design of the pneumatic tire shown in FIG. 1.
Figure 3:
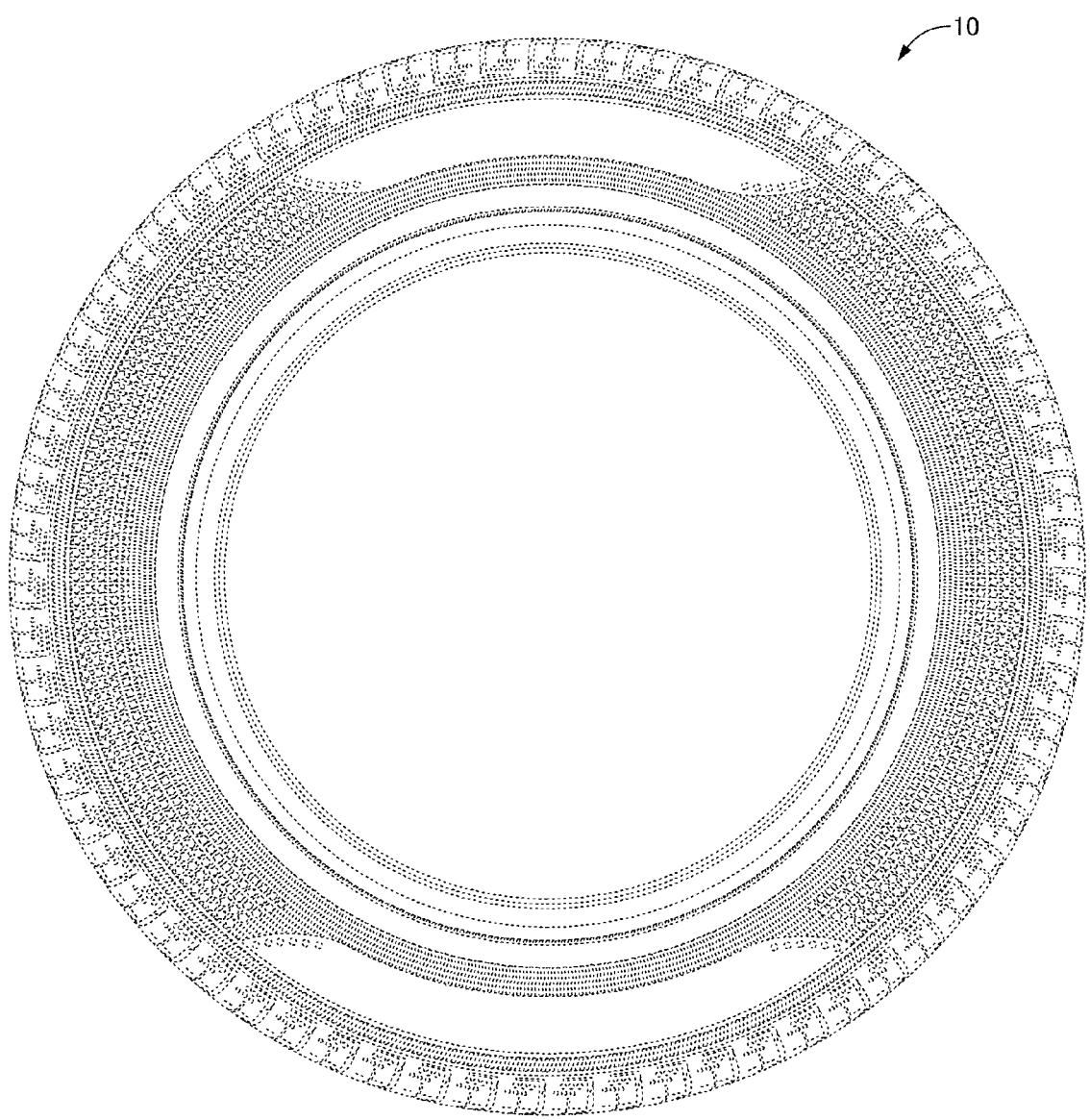
FIG. 3 is a rear view of the ornamental design of the pneumatic tire shown in FIG. 1.

As described above, it is preferable from a viewpoint of suppression of the appearance failure due to the air accumulation that the circumferential rib-like protrusion 24 corresponding to the vent groove of the vulcanization tire mold is provided. As illustrated in FIG. 2, when the equivalent diameter at the outermost recess located at the outermost position in the tire radial direction of the recesses 16 is compared with the equivalent diameter at the innermost recess located at the innermost position in the tire radial direction of the recesses 16, the equivalent diameter of the outermost recess is larger than the equivalent diameter of the innermost recess. Further, between the outermost recess and the innermost recess in the tire radial direction, the equivalent diameter of the recess 16 provided outward in the tire radial direction is larger than or equal to the equivalent diameter of the recess 16 provided inward in the tire radial direction. Namely, the equivalent diameter of the recess 16 increases from an inside to an outside in the tire radial direction successively or in a step-by-step manner between the innermost recess and the outermost recess. The equivalent diameter is changed thus, whereby the turbulence separation is effectively eliminated corresponding to the fact that the closer to the outside of the tire radial direction, the higher the tire rotation speed.

Figure 8:
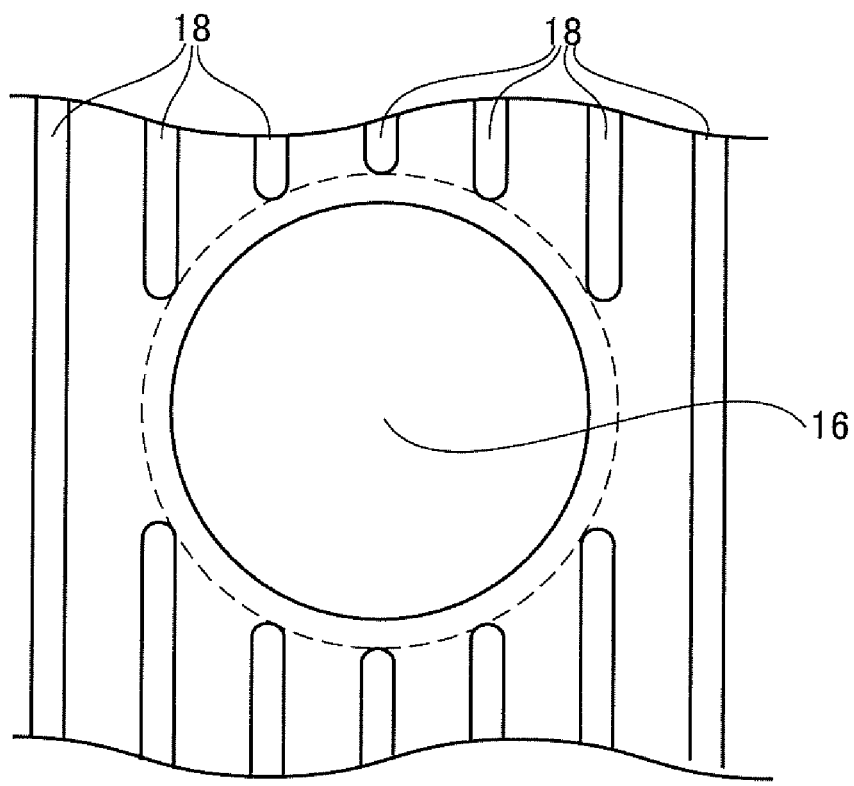
FIG. 8 is a plan view for explaining an arrangement of the valley portion and the recess in the embodiment shown in FIG. 4.
Figure 9:
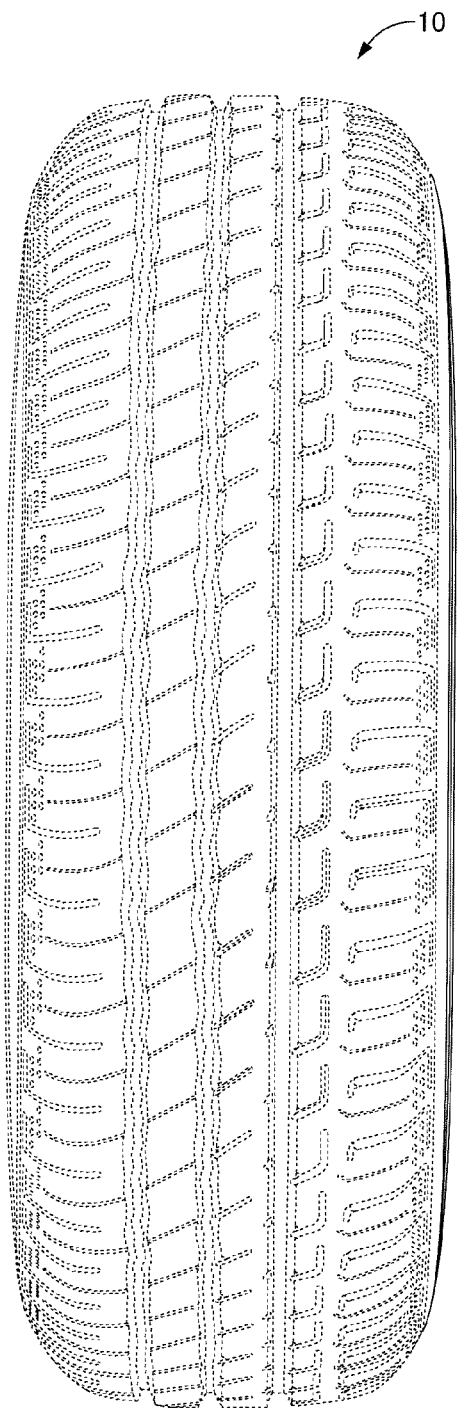
FIG. 9 illustrates a left-side view of the ornamental design for the pneumatic tire shown in FIG. 4.
Figure 10:
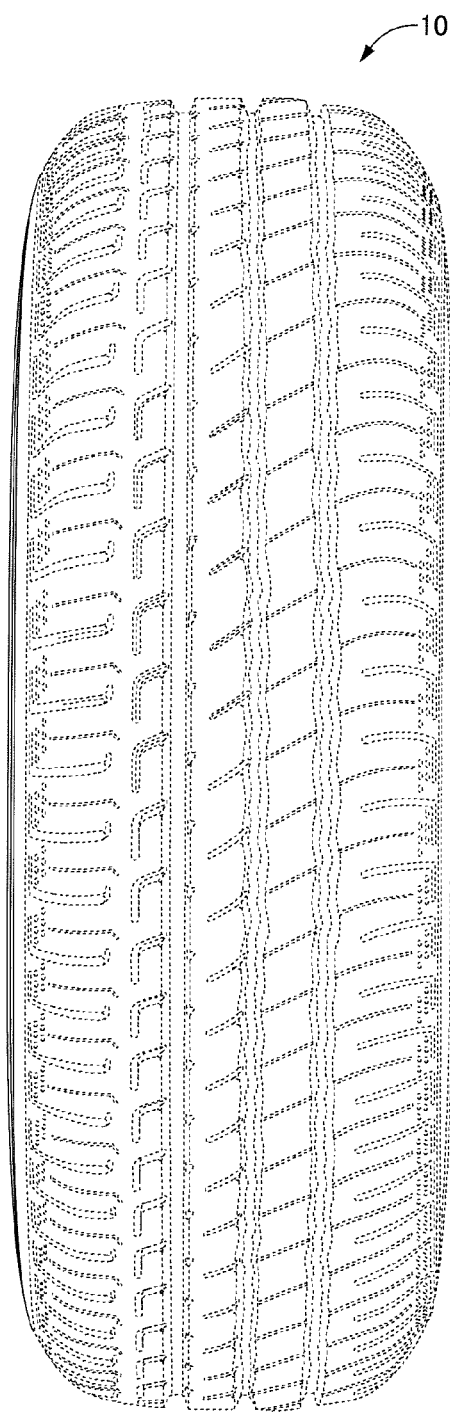
FIG. 10 illustrates a right-side view of the ornamental design for the pneumatic tire shown in FIG. 1.
Figure 11:
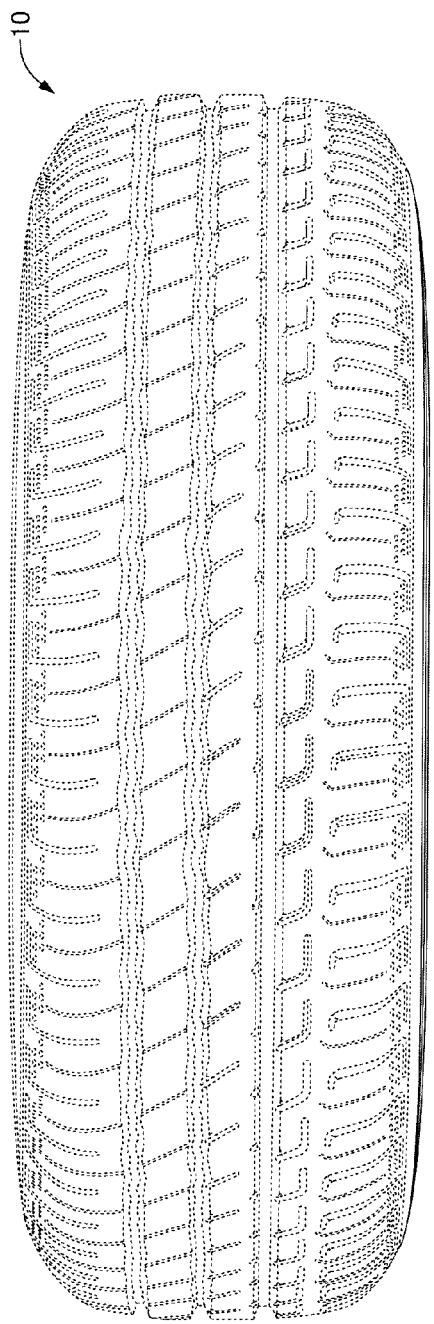
FIG. 11 illustrates a top plan view of the ornamental design for the pneumatic tire shown in FIG. 1.
Figure 12:
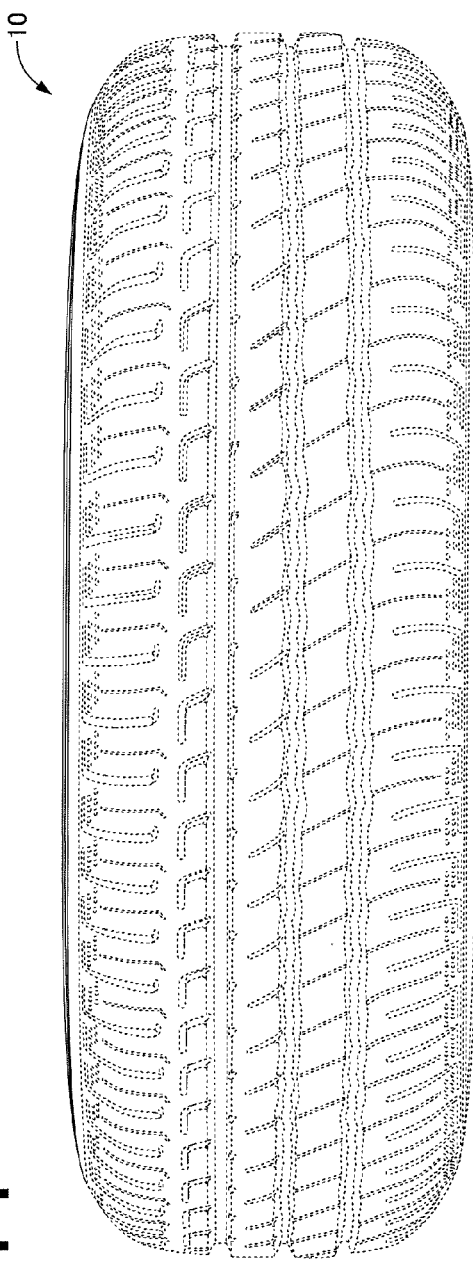
FIG. 12 illustrates a bottom plan view of the ornamental design for the pneumatic tire shown in FIG. 1.
Figure 13:
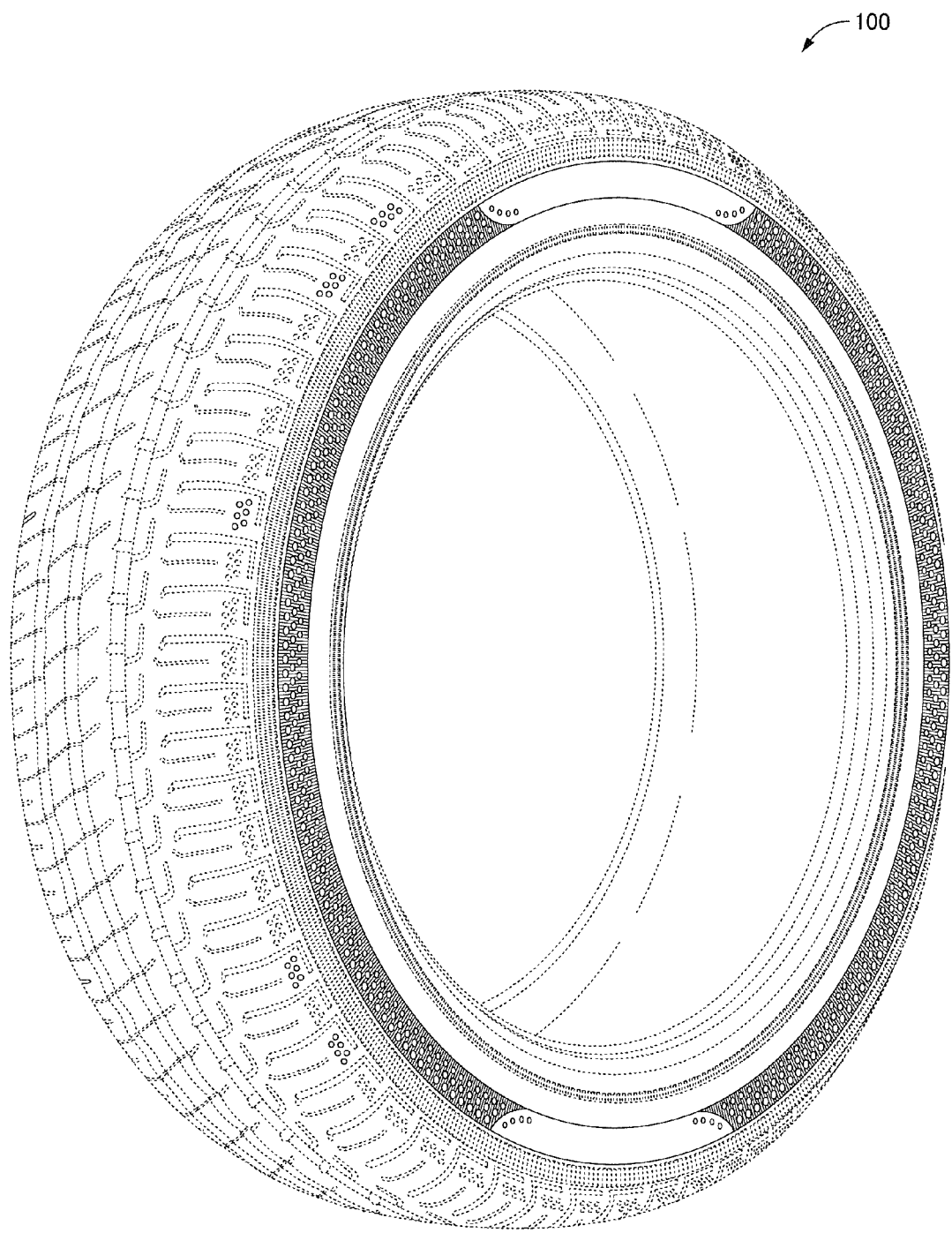
FIG. 13 illustrates a perspective view of an ornamental design for a pneumatic tire of another disclosed embodiment with parts of the sidewall portions, the tread portions and the bead portions being indicated by broken lines.
Figure 14:
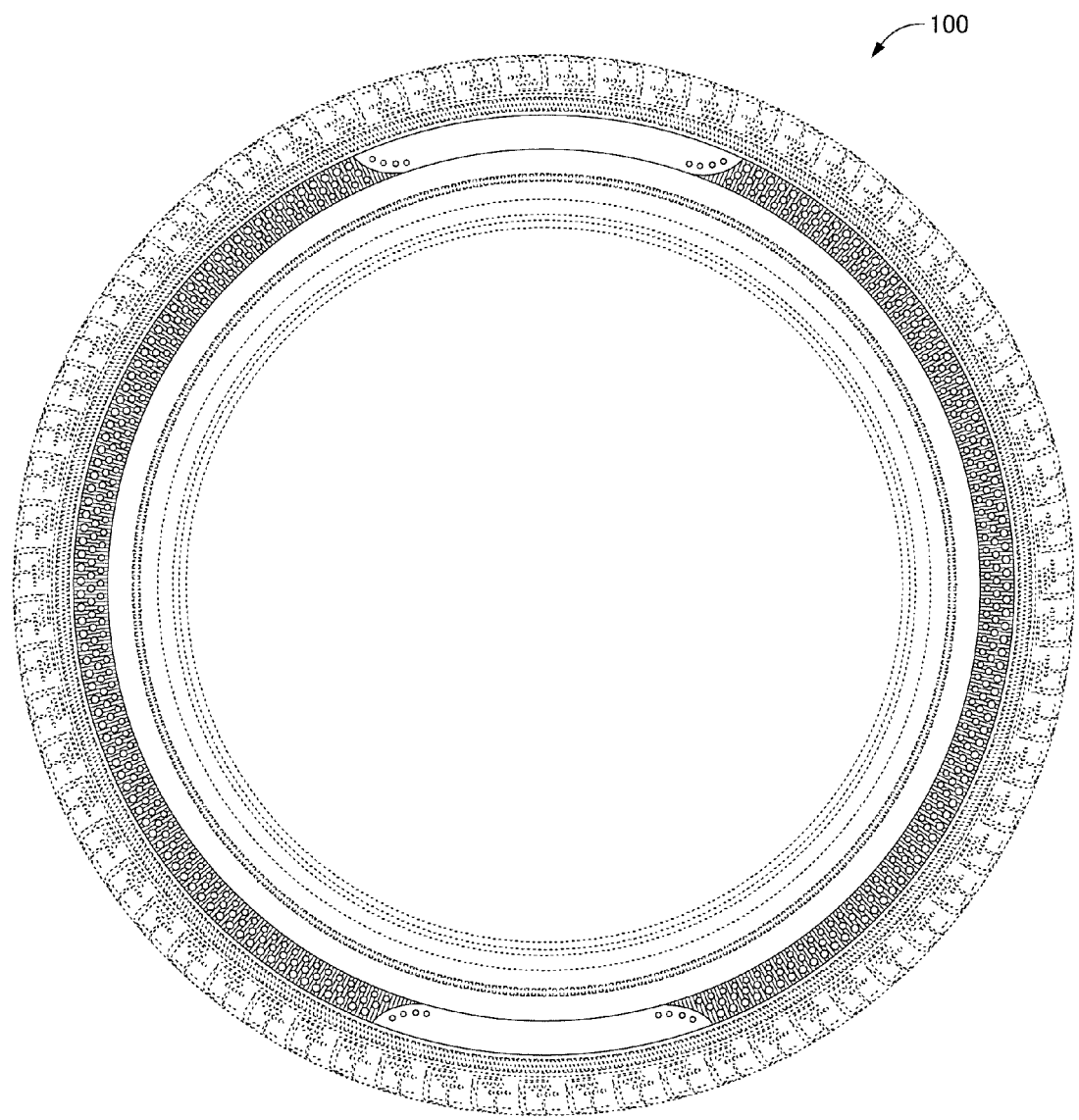
FIG. 14 illustrates a front view of the ornamental design for the pneumatic tire shown in FIG. 13.
Figure 15:
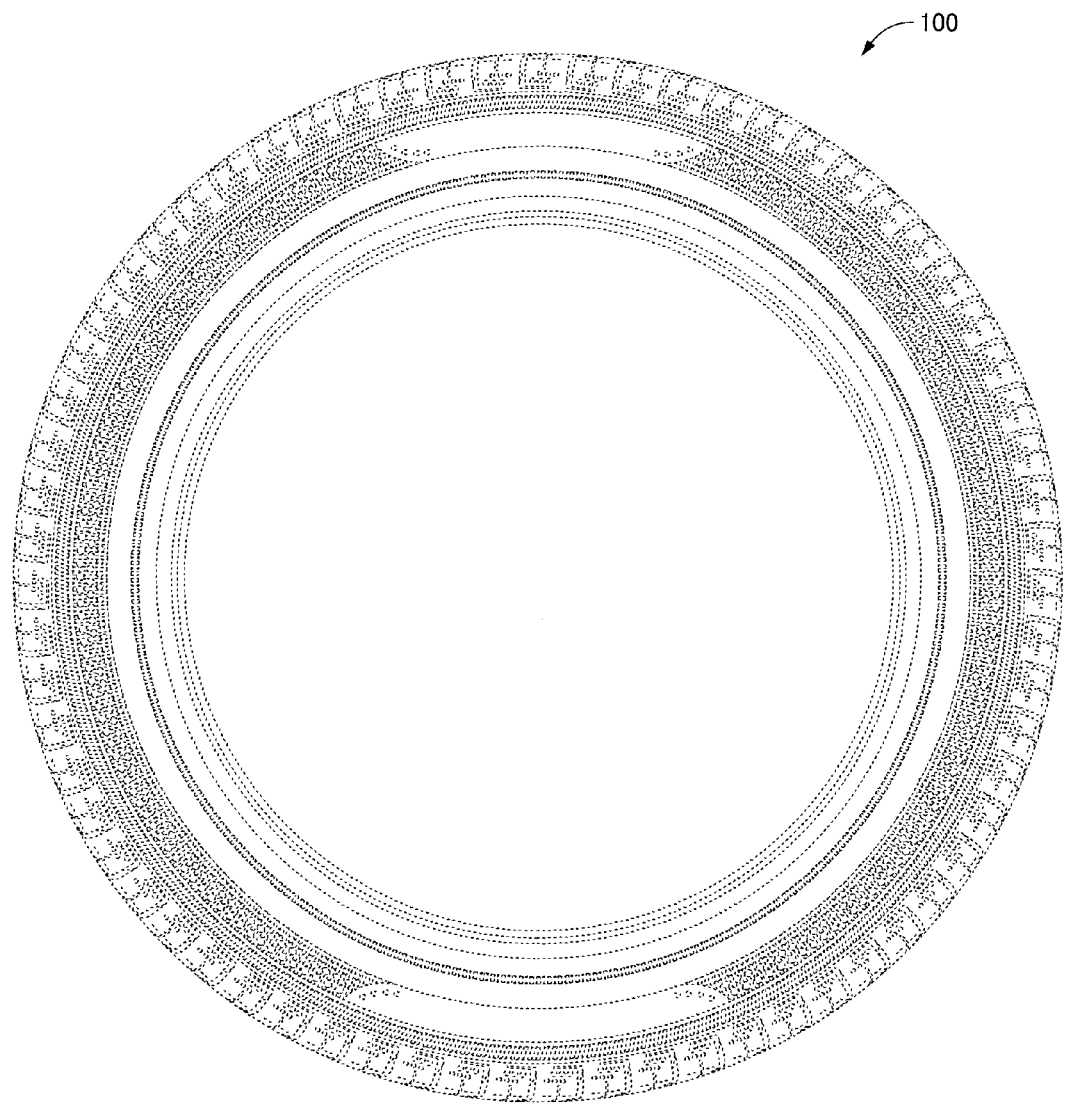
FIG. 15 illustrates a rear view of the ornamental design for the pneumatic tire shown in FIG. 13.
Figure 16:
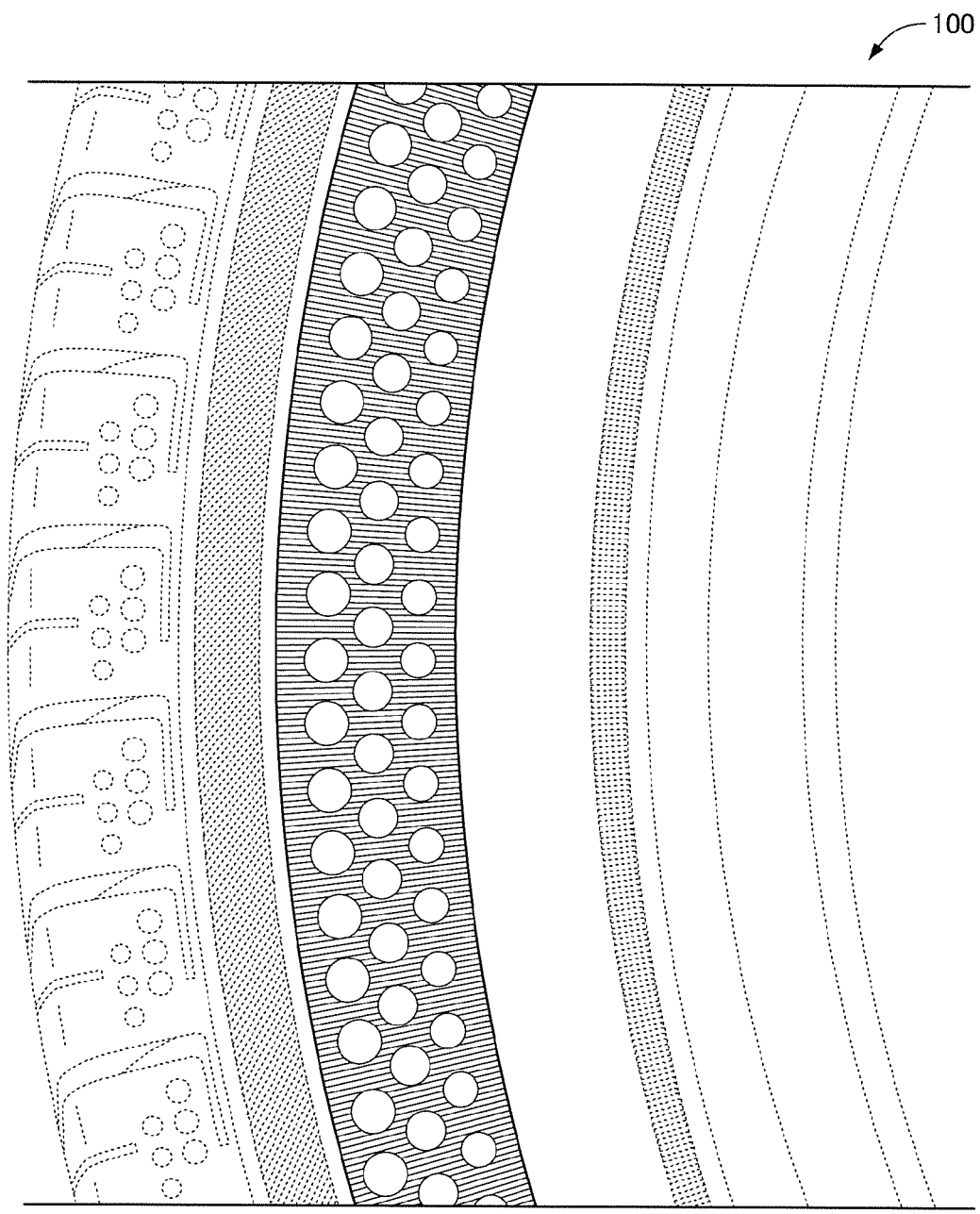
FIG. 16 is an enlarged view of a sidewall portion of the ornamental design for the pneumatic tire shown in FIG. 13.
Figure 17:
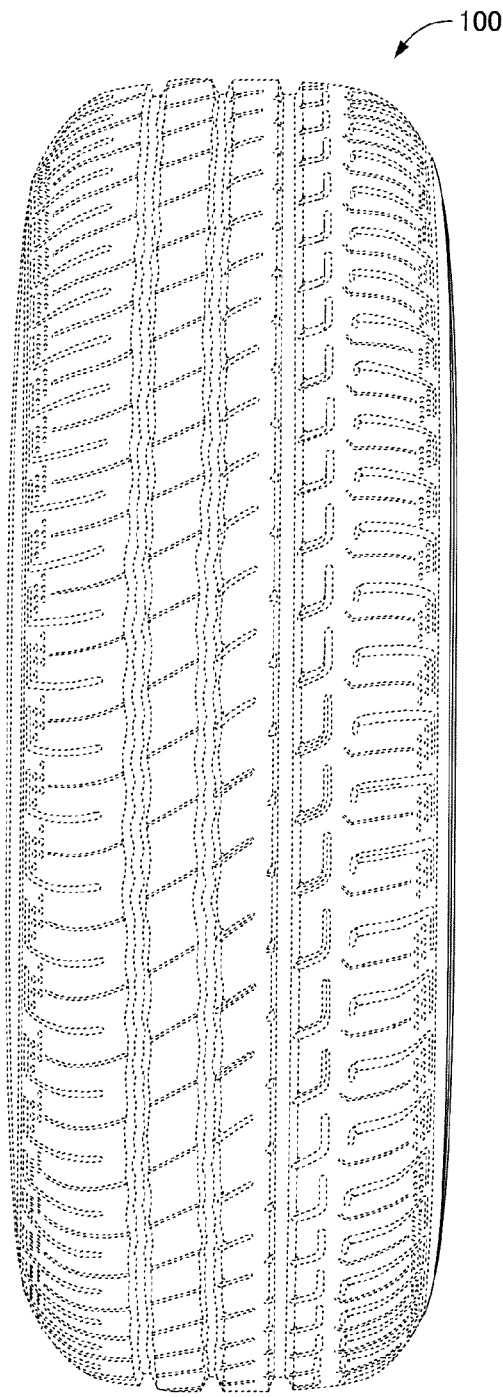
FIG. 17 illustrates a left-side view of the ornamental design for the pneumatic tire shown in FIG. 13.
Figure 18:
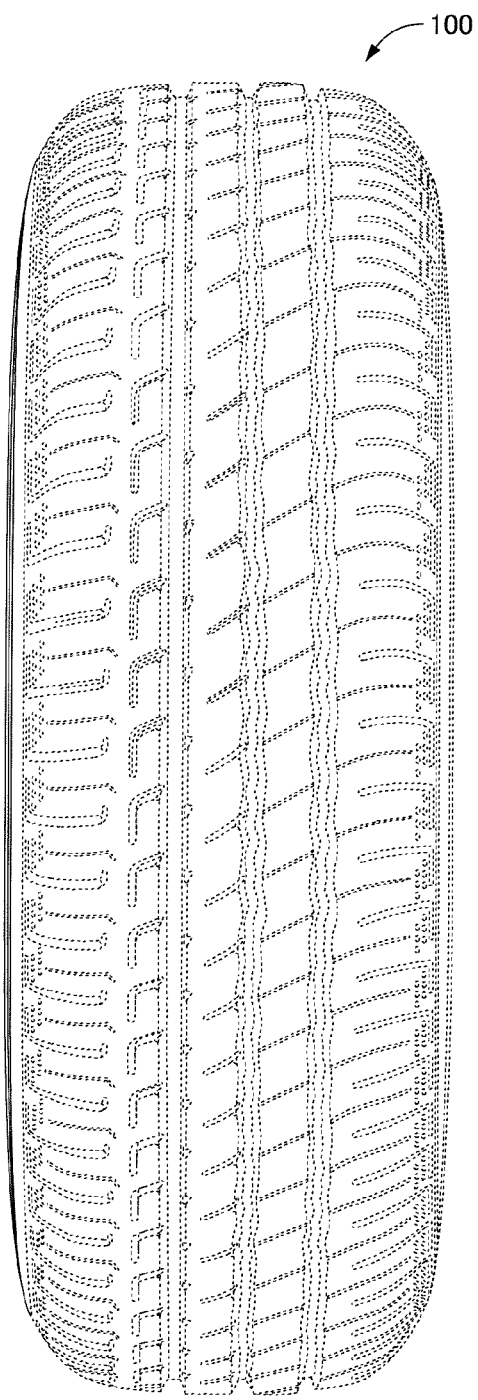
FIG. 18 illustrates a right-side view of the ornamental design for the pneumatic tire shown in FIG. 13.
Figure 19:
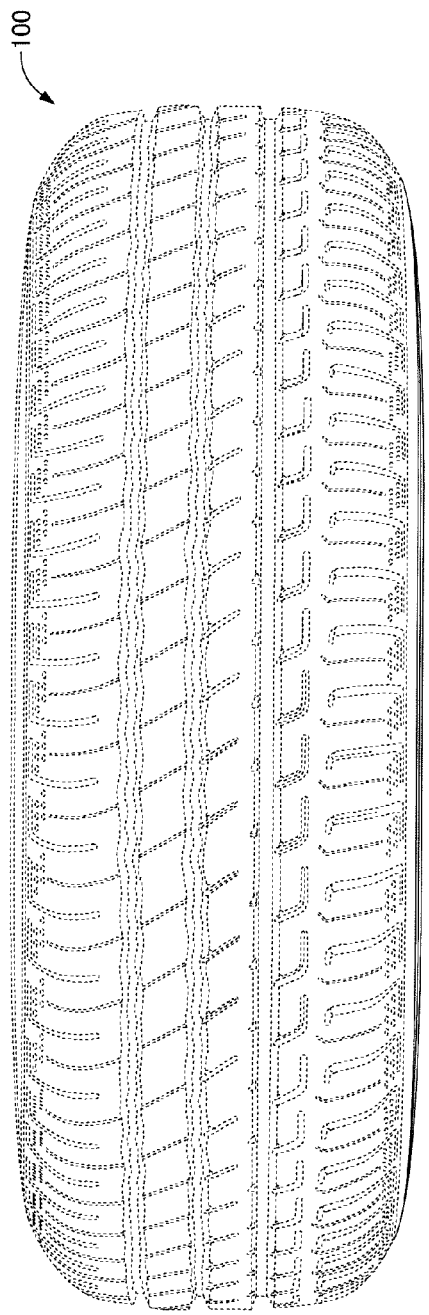
FIG. 19 illustrates a top plan view of the ornamental design for the pneumatic tire shown in FIG. 13.
Figure 20:
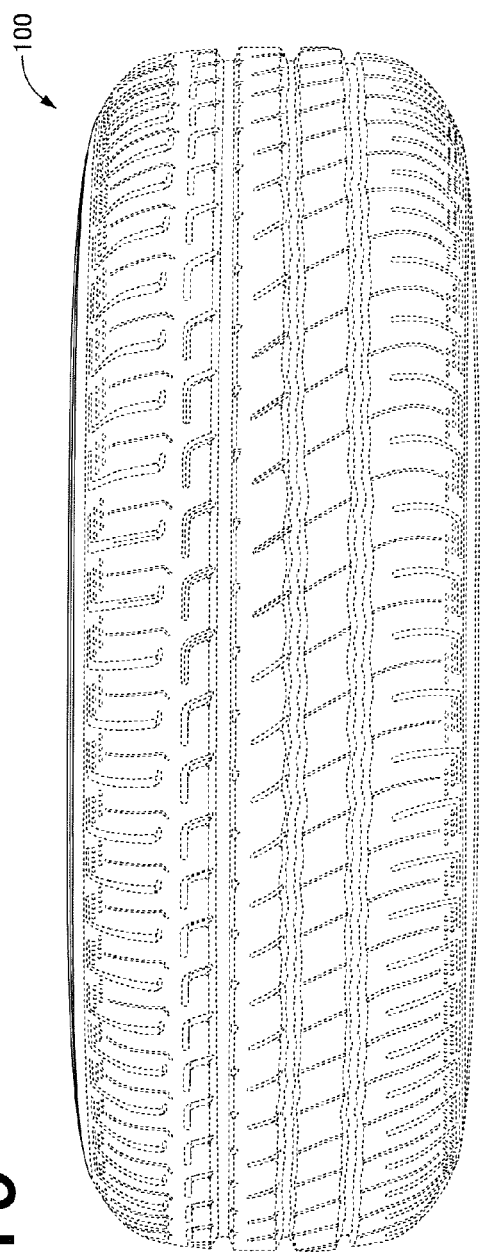
FIG. 20 illustrates a bottom plan view of the ornamental design for the pneumatic tire shown in FIG. 13.

FIG. 8 is a plan view for explaining an arrangement of the valley portion 18 and the recess 16. As illustrated in FIG. 8, it is preferable from a viewpoint of producing the vulcanization tire mold at low cost that the valley portions 18 are terminated immediately before the valley portions 18 are abutted against the recesses 16 so that the valley portions 18 do not connect to the recesses 16. It is preferable that the extension of the valley portions 18 is stopped within a range of more than 0 mm and not more than 0.2 mm, for example, from the outer circumference of each recess 16.

It is further preferable that the first region $R_1$ has rows of the recesses 16 substantially linearly extending in one direction and provided in each certain circumferential angle in the tire circumferential direction. The extending direction of the row of the recesses 16 is a direction of not less than 30 degrees and less than 90 degrees to the tire circumferential direction. The rows of the recesses 16 are provided in the tire circumferential direction at a certain circumferential angle of 1 degree to 2 degrees, for example. In the present embodiment, although the serration pattern formed by a plurality of the valley portions 18 extending in one direction is provided, the serration pattern may have a plurality of the valley portions 18 extending in different directions and intersecting with each other.

FIGS. 13 to 20 illustrate another embodiment of a pneumatic tire. Specifically, FIGS. 13 to 20 illustrate an ornamental design for the pneumatic tire 100 as described herein. In the case of a partial tire design of the pneumatic tire 100, the broken line illustration of the environmental structure (the remaining structure of the pneumatic tire 100) in the drawings is not part of the claimed design. However, in the case of a full tire design of the pneumatic tire 100, the broken lines can instead be depicted as solid lines to illustrate incorporation of the remaining structure as part of the ornamental design for the pneumatic tire 100.

The above pneumatic tire 10 having the sidewall portion is produced, and the effects are studied. The size of the produced pneumatic tires is 185/65R15. For the evaluation of the produced pneumatic tire, four produced pneumatic tires are mounted to a motor assist drive of passenger car (front-wheel drive) of 1500 cc displacement, and the fuel efficiency is evaluated. Meanwhile, the appearance failure due to the air accumulation of the produced pneumatic tire is evaluated.

For the evaluation of the fuel efficiency, the fuel consumption (litter/km) is calculated from the fuel consumed when the passenger car is driven at the speed of 100 km/h and 500 laps on a round course of 2 km in a round. The fuel efficiency is represented by an index when the fuel efficiency of the pneumatic tire of a conventional example is 100. As the index becomes larger, the fuel efficiency is improved.

Meanwhile, in order to evaluate the appearance failure, an average ratio (%) of non-defective products with no appearance failure due to the air accumulation is calculated when 100 pneumatic tires with specifications indicated in the table in FIG. 21 are produced. Table 1 is indicative of the specifications of the produced pneumatic tires and the evaluation results.

In the conventional example 1 indicated in the table 1, the recesses 16 are provided, but the valley portions 18 are not provided, that is, no serration pattern is provided. In a conventional example 2, the recesses 16 are provided, but the valley portions 18 are not provided, that is, no serration pattern is provided. In addition, no vent hole is provided at the portion corresponding to the sidewall surface of the vulcanization tire mold, that is, no spew trace is provided on the sidewall surface. In the examples 1 to 10, the side pattern of the embodiment illustrated in FIGS. 1 to 12 is used.

According to the comparison between the conventional examples 1 and 2 and the example 1 in the table 1, by virtue of the provision of the recesses and the serration pattern, the average ratio is increased, and, at the same time, the fuel efficiency is improved. The improvement of the fuel efficiency is the result of the reduction of the air resistance.

According to the comparison of the examples 1, 2, 3, 9, and 10, the equivalent diameter of the recesses 16 is preferably 3 to 15 mm from viewpoints of the improvement of the fuel efficiency and, furthermore, the reduction of the air resistance. Further, according to the comparison of the examples 1, 4, 5, 6, and 7, the area ratio of the entire area occupied by the recesses 16 to a surface area of the partial region where the recesses 16 are arranged in a cluster is preferably 25 to 60% from viewpoints of the improvement of the fuel efficiency and, furthermore, the reduction of the air resistance.

In the above examples, even when no air vent hole of the vulcanization tire mold is provided at the portion corresponding to the sidewall surface, the appearance failure due to the air accumulation hardly occurs, and therefore, it is possible to provide a pneumatic tire which has no spew or spew trace on the sidewall surface and reduces the air resistance. The appearance failure due to the air accumulation hardly occurs, and therefore, even when a tire with a thin side wall rubber member is used, the average ratio can be maintained, and the tire with a thin side wall rubber member can be manufactured efficiently.

Although the pneumatic tire of this invention has been described in detail, the invention is not limited to the above embodiment, and it is obvious that the invention may be variously improved and modified without departing from the scope of the invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A pneumatic tire comprising:
a plurality of dimple-like recesses provided in a first region that includes a tire maximum width position of a sidewall surface of the pneumatic tire; and
a plurality of linear valley portions formed by serration of the sidewall surface, the linear valley portions extending linearly in one direction in the first region and provided around each of the recesses so as to enclose each of the recesses, and a depth of each of the valley portions taken from the sidewall surface is smaller than a depth of each of the recesses taken from the sidewall surface.

2. The pneumatic tire according to claim 1, wherein
a size of an occupied area of each of the recesses on the sidewall surface is represented by an equivalent diameter of a circle, and an interval distance between adjacent ones of the linear valley portions is smaller than the equivalent diameter.

3. The pneumatic tire according to claim 2, wherein
the equivalent diameter is 3 to 10 times the interval distance between the linear valley portions.

4. The pneumatic tire according to claim 2, wherein
the equivalent diameter is 3 to 15 mm.

5. The pneumatic tire according to claim 2, wherein
the first region includes a second region in which the recesses are arranged in a cluster; and
a portion of the second region that includes the recesses occupies 25 to 60% of a total surface area of the second region.

6. The pneumatic tire according to claim 2, wherein
a size of an occupied area of each of the recesses on the sidewall surface is represented by a respective equivalent diameter of a circle, and the recesses have one of the following characteristics:
the respective equivalent diameter of an outermost one of the recess in a tire radial direction is larger than the respective equivalent diameter of an innermost one of the recess in the tire radial direction; and
the respective equivalent diameters of the recesses successively increase in a direction radially outward along the tire radial direction from the innermost recess to the outermost recess.

7. The pneumatic tire according to claim 6, further comprising
a circumferential rib-like protrusion continuously extending in a tire circumferential direction and maintaining contact with a side edge periphery of the first region in a tire radial direction, the protrusion including a spew point-like projection at a top portion thereof; and
wherein a ridge formed between adjacent ones of the valley portions of the first region is connected to the circumferential rib-like protrusion.

8. The pneumatic tire according to claim 1, wherein
the first region includes a second region in which the recesses are arranged in a cluster; and
a portion of the second region that includes the recesses occupies 25 to 60% of a total surface area of the second region.

9. The pneumatic tire according to claim 2, wherein
the valley portions are spaced from the recesses.

10. The pneumatic tire according to claim 2, wherein
the recesses are arranged in rows, with each of the rows extending in a prescribed circumferential angle along a tire circumferential direction.

11. The pneumatic tire according to claim 1, wherein
each of the recesses is formed to be more depressed than a bottom surface of any of the valley portions adjacent thereto.

12. The pneumatic tire according to claim 1, wherein
a size of an occupied area of each of the recesses on the sidewall surface is represented by a respective equivalent diameter of a circle, and the recesses have one of the following characteristics:
the respective equivalent diameter of an outermost one of the recess in a tire radial direction is larger than the respective equivalent diameter of an innermost one of the recess in the tire radial direction; and
the respective equivalent diameters of the recesses successively increase in a direction radially outward along the tire radial direction from the innermost recess to the outermost recess.

13. The pneumatic tire according to claim 1, wherein
the valley portions are spaced from the recesses.

14. The pneumatic tire according to claim 1, wherein
the recesses are arranged in rows, with each of the rows extending in a prescribed circumferential angle along a tire circumferential direction.

15. The pneumatic tire according to claim 1, further comprising
an undecorated region including a smooth surface without the valley portions and disposed adjacent to a side edge periphery of the first region;
a mark region including at least one of a character and a symbol and being surrounded by the undecorated region; and
a ridge formed between adjacent ones of the valley portions in the first region, the ridge including a top portion located at a depressed position relative to the smooth surface.

16. The pneumatic tire according to claim 15, further comprising
a circumferential rib-like protrusion continuously extending in a tire circumferential direction and maintaining contact with a side edge periphery of the first region in a tire radial direction, the protrusion including a spew point-like projection at a top portion thereof; and
wherein a ridge formed between adjacent ones of the valley portions of the first region is connected to the circumferential rib-like protrusion.

17. The pneumatic tire according to claim 1, further comprising
a pair of sidewalk; and
a tread portion disposed between the sidewalk, one of the sidewalk including the sidewall surface.

18. A pneumatic tire comprising:
a plurality of dimple-like recesses provided in a first region that includes a tire maximum width position of a sidewall surface of the pneumatic tire; and
a plurality of linear valley portions formed by serration of the sidewall surface, the linear valley portions extending linearly in one direction in the first region and provided around each of the recesses so as to enclose each of the recesses;
a size of an occupied area of each of the recesses on the sidewall surface is represented by a respective equivalent diameter of a circle, and the recesses have one of following characteristics:
the respective equivalent diameter of an outermost one of the recess in a tire radial direction is larger than the respective equivalent diameter of an innermost one of the recess in the tire radial direction; and the respective equivalent diameters of the recesses successively increase in a direction radially outward along the tire radial direction from the innermost recess to the outermost recess.

19. A pneumatic tire comprising:

a plurality of dimple-like recesses provided in a first region that includes a tire maximum width position of a sidewall surface of the pneumatic tire;

a plurality of linear valley portions formed by serration of the sidewall surface, the linear valley portions extending linearly in one direction in the first region and provided around each of the recesses so as to enclose each of the recesses;

an undecorated region including a smooth surface without the valley portions and disposed adjacent to a side edge periphery of the first region;

a mark region including at least one of a character and a symbol and being surrounded by the undecorated region; and a ridge formed between adjacent ones of the valley portions in the first region, the ridge including a top portion located at a depressed position relative to the smooth surface.

20. A pneumatic tire comprising:

a plurality of dimple-like recesses provided in a first region that includes a tire maximum width position of a sidewall surface of the pneumatic tire, a size of an occupied area of each of the recesses on the sidewall surface being represented by an equivalent diameter of a circle; and a plurality of linear valley portions formed by serration of the sidewall surface, the linear valley portions extending linearly in one direction in the first region and provided around each of the recesses so as to enclose each of the recesses, an interval distance between adjacent ones of the linear valley portions being smaller than the equivalent diameter, and the recesses being arranged in rows, with each of the rows extending in a prescribed circumferential angle along a tire circumferential direction.

* * * * *

UNITED STATES PATENT AND TRADEMARK OFFICE
CERTIFICATE OF CORRECTION

PATENT NO. : 8,381,786 B2
APPLICATION NO. : 13/118744
DATED : February 26, 2013
INVENTOR(S) : Masahiro Ebiko et al.

It is certified that error appears in the above-identified patent and that said Letters Patent is hereby corrected as shown below:

On the title page, item (75), please correct second inventor's residence information;

Hiroshi Tokizaki, Hiratsuka (JP)

to

-- Hiroshi Tokizaki, Minato-ku (JP)

Signed and Sealed this
Ninth Day of April, 2013

Teresa Stanek Rea
*Acting Director of the United States Patent and Trademark Office*